(12) United States Patent
Lin

(10) Patent No.: US 9,024,919 B2
(45) Date of Patent: May 5, 2015

(54) LIGHT EMITTING DIODE DISPLAY PANEL

(71) Applicant: Hon Hai Precision Industry Co., Ltd., New Taipei (TW)

(72) Inventor: Chen-Han Lin, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 0 days.

(21) Appl. No.: 13/973,988

(22) Filed: Aug. 22, 2013

(65) Prior Publication Data

US 2014/0176514 A1 Jun. 26, 2014

(30) Foreign Application Priority Data

Dec. 26, 2012 (TW) .............................. 101150162 A

(51) Int. Cl.
*G09G 3/22* (2006.01)
*G06F 3/0354* (2013.01)
*G06F 3/041* (2006.01)
*G06F 3/042* (2006.01)
*H01L 27/32* (2006.01)

(52) U.S. Cl.
CPC .......... *G06F 3/03542* (2013.01); *G06F 3/0412* (2013.01); *G06F 3/042* (2013.01); *H01L 27/32* (2013.01)

(58) Field of Classification Search
CPC ... G06F 3/0308; G06F 3/03542; G06F 3/03545
USPC ................................ 178/19.05; 345/179–184
See application file for complete search history.

(56) References Cited

U.S. PATENT DOCUMENTS

2014/0133134 A1* 5/2014 Kim et al. ...................... 362/109
2014/0145944 A1* 5/2014 Chang ............................ 345/157

* cited by examiner

*Primary Examiner* — Michael Pervan

(74) *Attorney, Agent, or Firm* — Novak Druce Connolly Bove + Quigg LLP

(57) ABSTRACT

A light emitting diode display panel includes a control circuit and a plurality of pixels arranged in a matrix. Each of the pixels includes a first light source and a first light sensing element. The first light sensing element receives a first optical signal from a lighting pen and generates a first control signal to the control circuit. According to the first control signal, the control circuit turns on the first light source in the pixel. The pixels further comprise a first polarizer covering the first light sensing element. When the lighting pen emits the first optical signal, a polarization direction of the light from the lighting pen is parallel to a polarization direction of the first polarizer. Therefore, the first optical signal can pass through the first polarizer and be received by the first light sensing element.

16 Claims, 6 Drawing Sheets

LIGHT EMITTING DIODE DISPLAY PANEL

BACKGROUND

1. Technical Field

The disclosure generally relates to a writing device, and particularly to a light emitting diode display panel.

2. Description of Related Art

In traditional blackboard, a lot of dust is generated when writing or erasing in the blackboard. The dust is not only polluting the environments, but also harmful to health.

What is needed, therefore, is a light emitting diode display panel to overcome the above described disadvantages.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

An embodiment of a light emitting diode display panel will now be described in detail below and with reference to the drawings.

Figure 1:
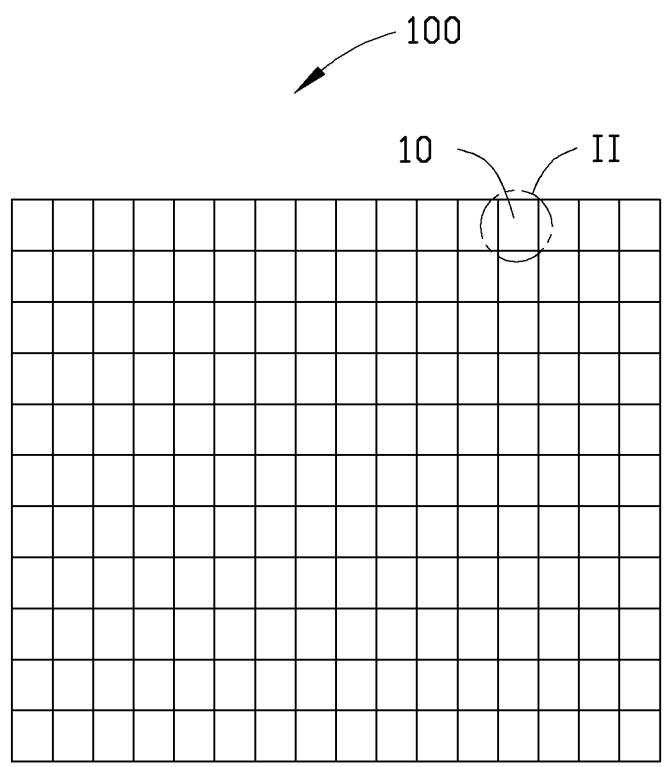
FIG. 1 is an illustrating view showing a light emitting diode display panel in accordance with an embodiment of the present disclosure.
Figure 2:
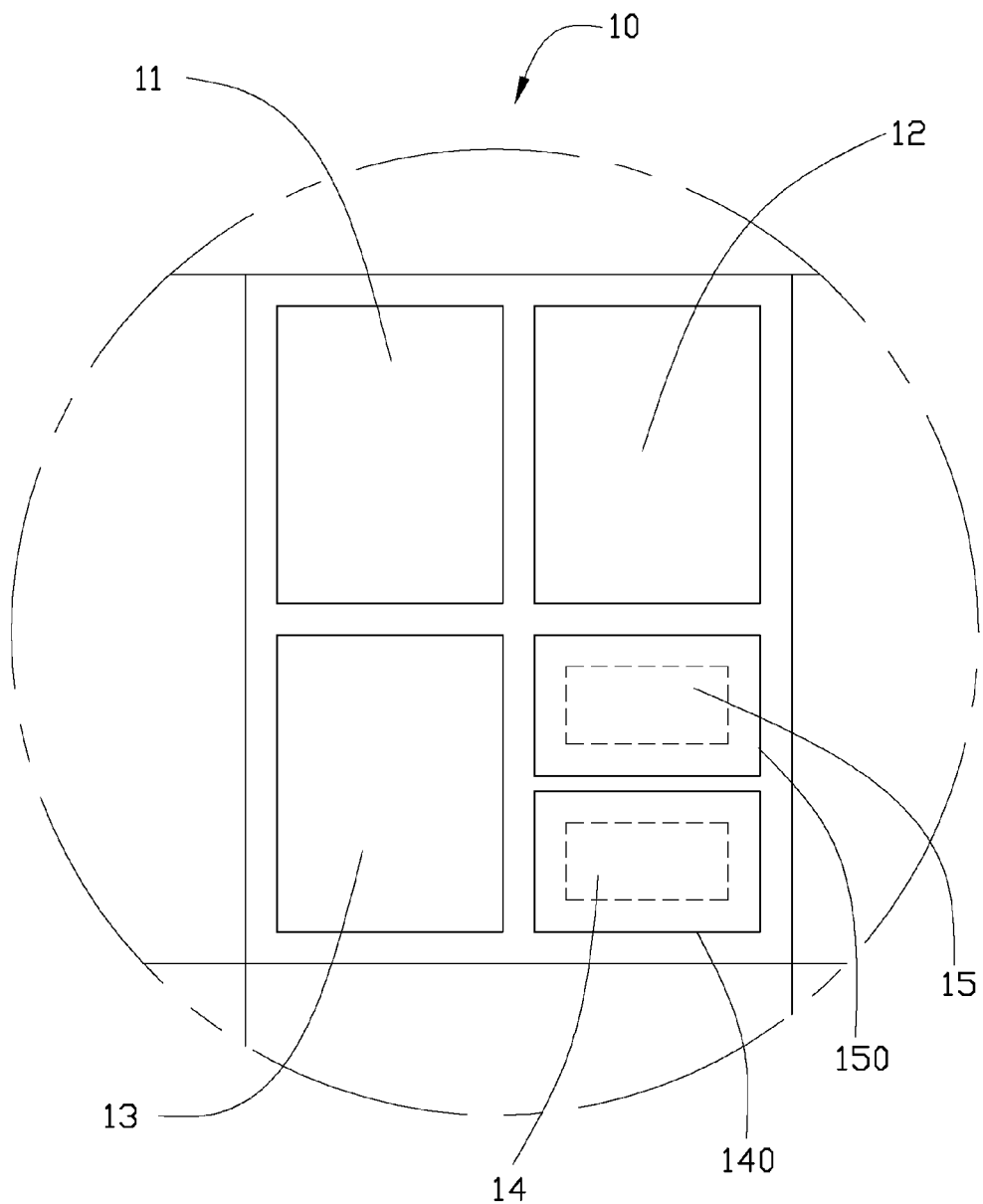
FIG. 2 is an enlarge view of an encircled part II of the light emitting diode display panel in FIG. 1.
Figure 3:
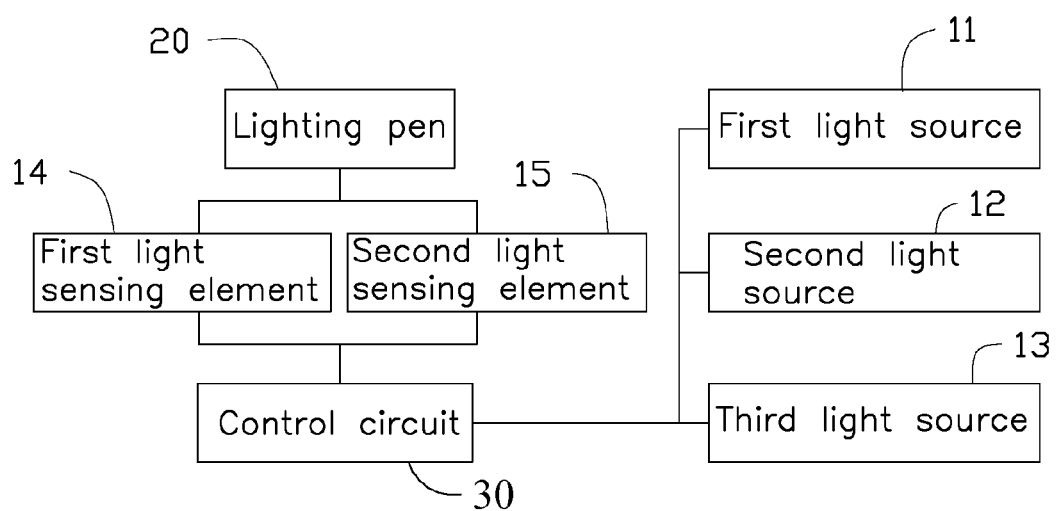
FIG. 3 is flow charts of showing the operation of the light emitting diode display panel in FIG. 1.

Referring to FIGS. 1-3, the light emitting diode display panel 100 includes a plurality of pixels 10 and a control circuit 30. The plurality of pixels 10 are arranged in a matrix. The number of the pixels 10 is determined by an area of the light emitting diode display panel 100. An increase of the number of the pixels 10 will improve a viewing quality of the light emitting diode display panel 100.

Each of the pixels 10 includes a first light source 11, a second light source 12, a third light source 13, a first light sensing element 14 and a second light sensing element 15. The first light source 11, the second light source 12, the third light source 13, the first light sensing element 14 and the second light sensing element 15 are arranged in a matrix. In this embodiment, the first light source 11 emits red lights, the second light source 12 emits green light and the third light source 13 emits blue light. The control circuit 30 is configured to turn on or turn off the first light source 11, the second light source 12, and the third light source 13. The first light sensing element 14 is configured to receive a first optical signal from outer environment and generate a first control signal to the control circuit 30. According to the first control signal, the control circuit 30 turns on the pixel 10. The second light sensing element 14 is configured to receive a second optical signal from outer environment and generate a second control signal to the control circuit 30. According to the second control signal, the control circuit 30 turns off the pixels 10. In this embodiment, the control circuit 30 selectively turns on one or more of the first light source 11, the second light source 12 and the third light source 13 to turn on the pixels 10. For example, when the first light sensing element 14 receives the first optical signal, the control circuit 30 can only turn on the first light source 11 to make the pixel 10 to emit red light. Similarly, the control circuit 30 can only turn on the second light source 12 to make the pixel 10 to emit green light or only turn on the third light source 13 to make the pixels 10 to emit blue light.

Figure 4:
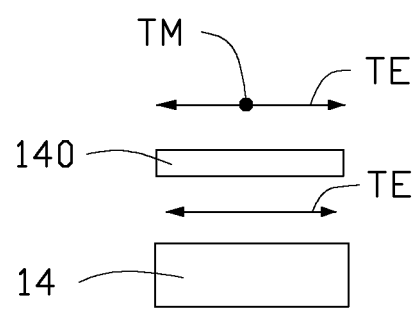
FIGS. 4-5 are illustrating views showing a light passing through the light emitting diode display panel in FIG. 1.
Figure 5:
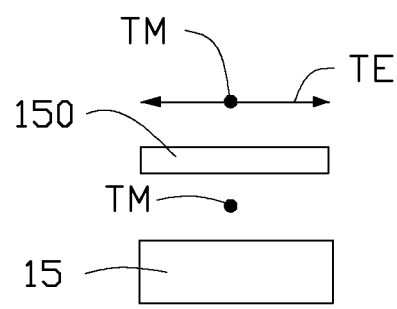

Referring also to FIGS. 4-5, the first light sensing element 14 is covered by the first polarizer 140, and the second light sensing element 15 is covered by the second polarizer 150. In this embodiment, the first polarizer 140 and the second polarizer 150 are linearly polarized films. A polarization direction of the first polarizer 140 is parallel to the TE-polarization of the light, and a polarization direction of the second polarizer 150 is parallel to the TM-polarization of the light. That is, the polarization direction of the first polarizer 140 is vertical to the polarization direction of the second polarizer 150. When a linearly polarized light emits to the first polarizer 140, only the light with a polarization direction parallel with that of the first polarizer 140 can pass through the first polarizer 140 and emits to the first light sensing element 14. The light with a polarization direction vertical to that of the first polarizer 140 will be blocked by the first polarizer 140 and can not be received by the first light sensing element 14. Therefore, when light in the first optical signal has a polarization direction vertical to that of the light in the second optical signal, the first optical signal and the second optical signal can not affect each other. To reduce an influence of light from environment or other light source, the first light sensing element 14 and the second light sensing element 15 generates control signals when the light achieves to a predetermined light intensity.

Figure 6:
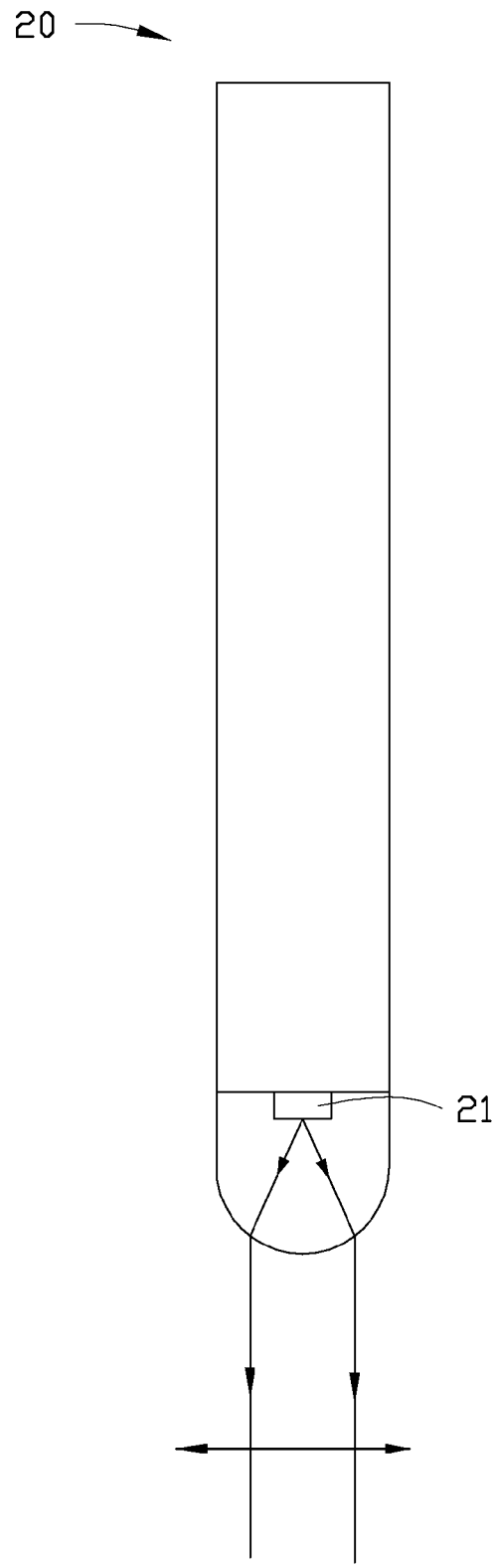
FIG. 6 is an illustrating view of a lighting pen using in the light emitting diode display panel in FIG. 1.

Referring to FIG. 6, a lighting pen 20 to generate the first optical signal and the second optical signal is provided. The lighting pen 20 and the light emitting diode display panel 100 together forms a writing device. The light pen 20 is a laser device, which includes a lighting section 21. The lighting section 21 emits a linearly polarized light. The lighting pen 20 has a label to illustrate the polarization direction of the linearly polarized light. When the polarization direction of the linearly polarized light from the lighting section 21 is parallel to the polarization direction of the first polarizer 140, the linearly polarized light can be received by the first light sensing element 14. Therefore, the control circuit 30 will turn on the pixel 10. When the lighting pen 20 is moving on the light emitting diode display panel 100, the control circuit 30 will sequentially turn on the pixels 10 to illustrate the moving track of the lighting pen 20. When the lighting pen 20 rotates 90 degrees, the polarization direction of the linearly polarized light from the lighting section 21 will be parallel to the polarization direction of the second polarizer 150, the linearly polarized light can be received by the second sensing element 15. Therefore, the control circuit 30 will turn off the pixel 10.

As described above, the light emitting diode display panel 100 illustrates information according to the moving of the lighting pen 20 in the light emitting diode display panel 100. No dust is generated in above process. In addition, the pixels 10 includes the first light source 11, the second light source 12 and the third light source 13 emitting different light. The moving track of the lighting pen 20 can be illustrated in multiple colors. Furthermore, by forming the first polarizer 140 and the second polarizer 150 on the first light sensing element 14 and the second light sensing element 15 respectively, the turning on or turning off of the pixels 10 can not be affected by each other.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A light emitting diode display panel, comprising:
a control circuit; and
a plurality of pixels arranged in a matrix, each of the pixels comprising a first light source and a first light sensing element, the first light sensing element receiving a first optical signal from a lighting pen and generating a first control signal to the control circuit, the control circuit turning on the first light source in the pixel according to the first control signal;
wherein the pixels further comprise a first polarizer covering the first light sensing element, when the lighting pen emits the first optical signal, a polarization direction of the light from the lighting pen is parallel to a polarization direction of the first polarizer, therefore, the first optical signal can pass through the first polarizer and be received by the first light sensing element.

2. The light emitting diode display panel of claim 1, wherein each of the pixels further comprises a second light sensing element, the second light sensing element receiving a second optical signal from the lighting pen and generating a second control signal to the control circuit, the control circuit turning off the first light source in the pixel according to the second control signal.

3. The light emitting diode display panel of claim 2, wherein the second light sensing element is covered by a second polarizer, and a polarization direction of the second polarizer is different from that of the first polarizer.

4. The light emitting diode display panel of claim 3, wherein the polarization direction of the second polarizer is vertical to the polarization direction of the first polarizer.

5. The light emitting diode display panel of claim 4, wherein when the lighting pen emits the second optical signal, a polarization direction of the light from the lighting pen is parallel to the polarization direction of the second polarizer, therefore, the second optical signal can be received by the second light sensing element.

6. The light emitting diode display panel of claim 1, wherein each of the pixels further comprises a second light source and a third light source, the first light source emits red light, the second light source emits green light and the third light source emits blue light.

7. The light emitting diode display panel of claim 6, wherein the control circuit selectively turns on one or more of the first light source, the second light source and the third light source.

8. The light emitting diode display panel of claim 6, wherein the first light source, the second light source, the third light source, the first light sensing element and the second light sensing element are arranged in matrix.

9. A writing device, comprising:
a lighting pen; and
a light emitting diode display panel, comprising:
a control circuit; and
a plurality of pixels arranged in a matrix, each of the pixels comprising a first light source and a first light sensing element, the first light sensing element receiving a first optical signal from the lighting pen and generating a first control signal to the control circuit, according to the first control signal, the control circuit turning on the first light source in the pixel;
wherein the pixels further comprise a first polarizer covering the first light sensing element, when the lighting pen emits the first optical signal, a polarization direction of the light from the lighting pen is parallel to a polarization direction of the first polarizer, therefore, the first optical signal can pass through the first polarizer and be received by the first light sensing element.

10. The writing device of claim 9, wherein each of the pixels further comprises a second light sensing element, the second light sensing element receiving a second optical signal from the lighting pen and generating a second control signal to the control circuit, the control circuit turning off the first light source in the pixel according to the second control signal.

11. The writing device of claim 10, wherein the second light sensing element is covered by a second polarizer, and a polarization direction of the second polarizer is different from that of the first polarizer.

12. The writing device of claim 11, wherein the polarization direction of the second polarizer is vertical to the polarization direction of the first polarizer.

13. The writing device of claim 12, wherein when the lighting pen emits the second optical signal, a polarization direction of the light from the lighting pen is parallel to the polarization direction of the second polarizer, therefore, the second optical signal can be received by the second light sensing element.

14. The writing device of claim 9, wherein each of the pixels further comprises a second light source and a third light source, the first light source emits red light, the second light source emits green light and the third light source emits a blue light.

15. The writing device of claim 14, wherein the control circuit selectively turns on one or more of the first light source, the second light source and the third light source.

16. The writing device of claim 15, wherein the first light source, the second light source, the third light source, the first light sensing element and the second light sensing element are arranged in matrix.

* * * * *